Nov. 30, 1937.  J. N. MOORE  2,100,996

GATE VALVE

Filed Feb. 13, 1936  3 Sheets-Sheet 1

INVENTOR.
John N. Moore
BY Loyal J. Miller
ATTORNEYS.

Nov. 30, 1937.  J. N. MOORE  2,100,996
GATE VALVE
Filed Feb. 13, 1936  3 Sheets-Sheet 3

INVENTOR.
John N. Moore
BY Loyal J. Miller
ATTORNEYS.

Patented Nov. 30, 1937

2,100,996

UNITED STATES PATENT OFFICE 2,100,996

GATE VALVE

John N. Moore, Oklahoma City, Okla., assignor of one-half to Tom G. Drake, Oklahoma City, Okla.

Application February 13, 1936, Serial No. 63,702

2 Claims. (Cl. 251—71)

My invention relates to gate valves, and particularly to gate valves for use upon high pressure lines such as oil and gas wells.

The objects of my invention are to provide a device of this class which is new, novel, practical and of utility; which will provide a gate valve having an approximately 45° angle beveled seat surrounding the inlet and a similar seat surrounding the outlet of the valve housing, and a closure having two parts each of which may be wedged into a seating position; the closure of which can be drawn clear of the flow-hole when in an open position; which can be used as a choke valve to permit a choke-flow; which will insure equal distribution of wear on the valve faces when a partial opening of the flow-hole is desired for use in proration, and the like; which will permit the use of the full flow-hole for full flow, swabbing, cleaning and the like; which will provide a positive high pressure for closing the flow-hole; which will be durable; and, which will be efficient in accomplishing all the purposes for which it is intended.

Most gate valves of present use consist substantially of a housing having a continuous flow hole therethrough, and a gate movable between seats across the flow hole in order to obstruct the flow of fluid therethrough. That type of gate valve cannot successfully be used as a choke-valve due to excessive wear by the fluid upon the seat and the end of the gate when the gate is in a partially opened position. Since the seats themselves are in fact the sides of grooves extending across the flow hole, they are not only prone to become worn by the flowing fluid, but the grooves are often partially filled by detritus or other extraneous matter in the fluid, thus impairing the proper closing of the gate.

My valve may be positively closed without danger of obstruction from detritus or the like.

With these and other objects in view as will more fully appear hereinbelow, my invention consists in the construction, novel features, and combination of parts hereinafter more fully described, pointed out in the claims hereto appended, and illustrated in the accompanying three-sheet drawing, of which, Figure 1 is an elevational sectional view taken in a plane lying longitudinally of the flow-line;

Like characters of reference designate like parts in all the figures.

Figure 1:
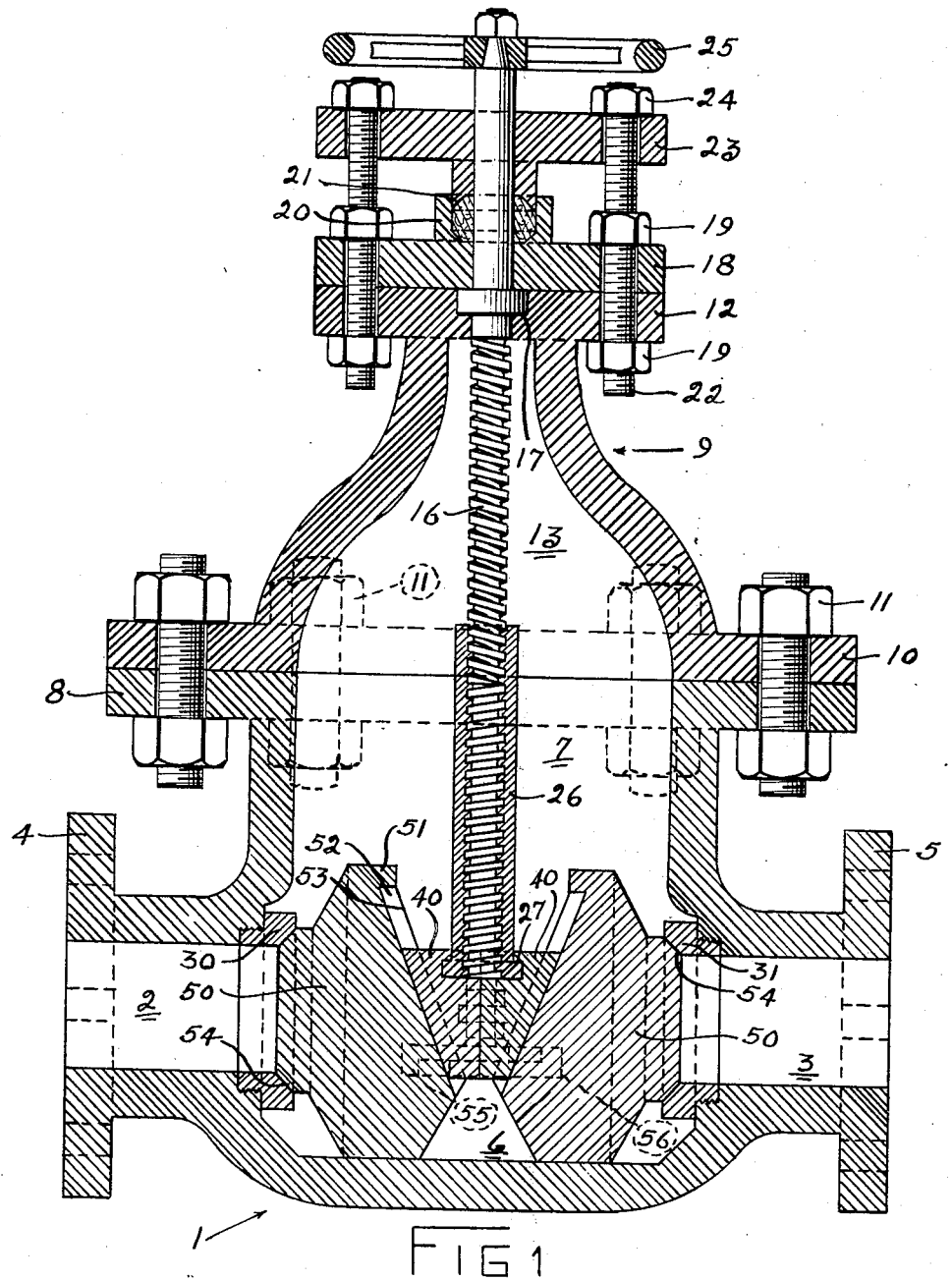

It is understood that various changes in the form, proportion, size, shape, weight and other details of construction, within the scope of my invention may be resorted to without departing from the spirit or broad principle of my invention and without sacrificing any of the advantages thereof; and it is also understood that the drawings are to be interpreted as being illustrative and not restrictive.

The inventive idea involved is capable of receiving a variety of mechanical expressions one of which, for the purpose of illustrating the invention, is shown in the accompanying drawings, wherein:—

The reference numeral 1 indicates as a whole a valve housing having an inlet 2 at its rear end, and an outlet 3 at its forward end. The housing is provided with flanges 4 and 5 whereby it may be connected in a flow line, not shown. Between the inner ends of the inlet and outlet portions is provided a valve chamber 6 which opens upwardly into a vertical chamber 7 which is surrounded at its upper end by an annular outstanding flange 8. A bonnet 9 having its lower flange 10 attached by bolts 11 to the flange 8 extends upwardly and terminates in a second outstanding annular flange 12. The bonnet 9 forms a chamber 13 which acts as a continuation of the chamber 7 when the bonnet is in place. The upper end of the bonnet is centrally bored to receive the smooth surfaced upper portion 14 of an actuating shaft 15, the lower portion of which is equipped with threads 16. The shaft 15 has an annular enlargement 17 which seats within a socket formed in the upper surface of the top of the bonnet. A plate or disc 18 is attached by nuts 19 upon bolts 22 to the upper surface of the bonnet and surrounds the shaft above the enlargement 17, the bonnet and plate cooperating to prevent longitudinal movement of the shaft.

Surrounding the shaft 15, the upper surface of the plate 18 is provided with an upstanding annular wall 20 for receiving packing material 21 which is adapted to be compressed into packing engagement with the shaft by a compression element 23 which is also engaged with the bolts 22 and adapted to be urged toward the plate 18 by a plurality of nuts 24 thereon.

The upper end of the shaft 15 is provided with a suitable hand-wheel 25, and its lower and threaded end portion is threadedly engaged within a hollow sleeve 26 having a square outstanding head 27 at its lower end.

The inner ends of the inlet 2 and outlet 3 are provided respectively with exteriorly threaded removable valve seats 30 and 31, each having a bevelled face.

Figure 2:
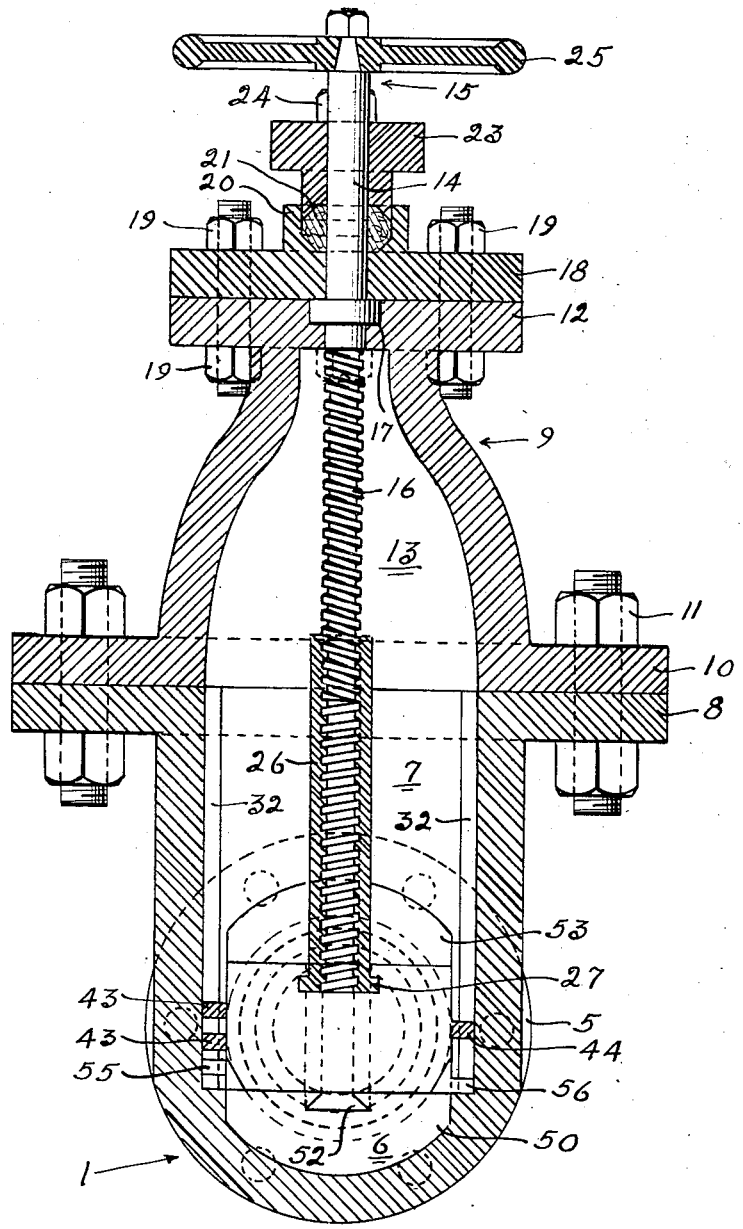
Figure 2 is an elevational sectional view taken in a plane lying at right angles to the flow-line.
Figure 8:
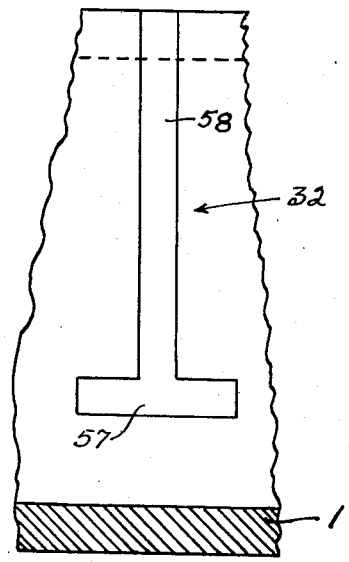
Figure 8 is an elevation of the side wall of the valve housing taken from the inside of the lower portion thereof and showing one of the T-shaped slots or grooves.

Intermediate the inner ends of the inlet and outlet, the sides of the housing 1 are each provided with an inverted T-shaped groove 32 (Figs. 2 and 8). The two grooves 32 are identically positioned with relation to the inner ends of the inlet and outlet and are in alinement with each other.

As a means for opening and closing the inlet and outlet simultaneously, the following described structure is provided.

Figure 3:
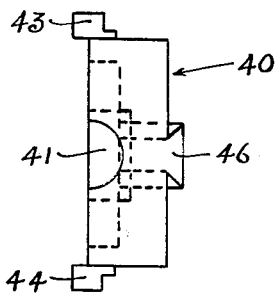
Figure 3 is a plan view of one of the closure operating wedges.
Figure 4:
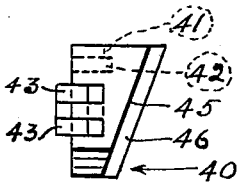
Figure 4 is an end elevation of the view shown in Fig. 3.
Figure 5:
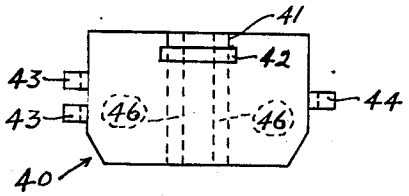
Figure 5 is a side elevation of the view shown in Fig. 3.
Figure 6:
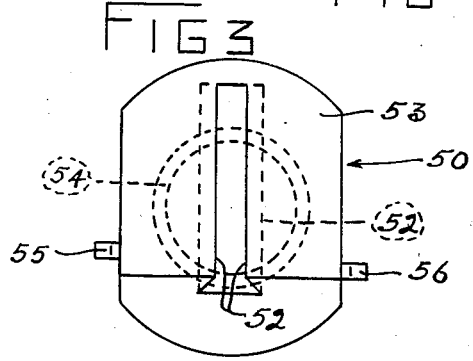
Figure 6 is an elevation of the inner face of one of the valve members showing the seating portion and the dove-tailed groove in dotted lines.
Figure 7:
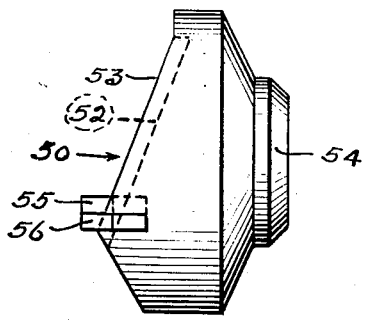
Figure 7 is a side elevation of the view shown in Fig. 6.

In Figs. 3, 4, and 5 is detailed one of two complemental wedge elements 40 which together form a wedge and each of which is provided in its upper and inner surface with a semi-cylindrical groove 41 below which is a larger half-square groove 42 for receiving one half of the square head 27 carried by the lower end of the sleeve 26. The opposite ends of the element 40 are provided with projecting guide lugs 43 and 44 which extend into the two T-shaped grooves 32 in the housing 1 and prevent rotation of the element 40 when the shaft 15 is rotated. The lug 44 of one of the elements 40 projects between the two lugs 43 of the other element 40 when the elements are placed around the head 27 of the sleeve, and thus independent vertical movement of the two elements 40 is prevented.

As may best be seen in Figs. 1 and 4, the outer surface 45 of each of the elements 40 is beveled upwardly and outwardly and this beveled surface is provided with a dove-tailed spline or rib 46 which extends longitudinally of the surface 45.

A closure element 50 is splined to each of the ribs 46 and is permitted a sliding engagement therewith, but is prevented from removal therefrom except by an upward and outward sliding movement. Its downward and inward movement is limited by the provision of an upper portion 51 which closes the upper end of each of the dove-tailed grooves 52 within which the ribs 46 are positioned. The inner faces 53 of each of the closure elements 50 are complementally beveled to fit the surface 45 of the wedge member 40 with which it is engaged, and longitudinal grooves 52 are provided in the surfaces of these faces 53.

The outer end of each of the closures 50 is provided with a beveled seating surface 54 adapted to seat within the seats 30 of the housing and to close the inlet and outlet respectively.

As best illustrated in Figs. 2, 3, and 5, each of the closure elements 50 is provided upon each of its sides with projecting lugs 55 and 56 which project respectively into the two T-shaped grooves 32 in the side walls of the housing.

*Operation*

Considering the valve to be in a closed position as shown in Fig. 1, the lugs 55 and 56 will be located in the horizontal portions 57 of the T-shaped grooves 32. Rotation of the shaft 15 by the hand wheel 25 will raise the sleeve 26 which in turn will raise the two wedge elements 40. Since the elements are dove-tailed to the closures 50, upward movement of the elements 40 will cause the closures 50 to be drawn toward each other, the lugs 55 and 56 sliding along the portions 57 and coming together in alinement with the vertical portion 58 of the grooves 32. This operation will of course unseat the portions 54 of the closures 50 from the seats 30 and 31. When the closures are in this position, they function as a choke-valve.

After the lugs 55 and 56 have met, further upward movement of the elements 40 will raise the lugs 55 and 56 within the portion 58 of the groove 32 and consequently the closures 50 will be raised out of the chamber 6 and into the chamber 7. Both the inlet 2 and outlet 3 will then be fully opened.

In closing the valve, the shaft 15 is rotated in an opposite direction and the elements 40 and closures 50 are forced downwardly until the lugs 55 and 56 reach the portions 57 of the grooves 32. Further downward movement of the elements 40 then causes the lugs 55 and 56 to travel away from each other in the portions 57 of the grooves 32 and the elements 40 then act as wedges to force the portions 54 of the closures 50 into positive seating positions.

The lugs 43 and 44 carried by the wedge elements 40 are so positioned vertically that they never leave the portions 58 of the grooves 32.

It may readily be seen that when the valve is in a fully open position, removal of the bonnet 9 will accomplish removal of the complete valve assembly since the portion 58 of the grooves 32 extend to the upper end of the housing 1. Replacement of any worn parts may then be quickly accomplished in an obvious manner.

From the foregoing description it may be seen that my structure accomplishes the following: permits the use of annular removable seating surfaces for the inlet and outlet; offers an unobstructed flow-hole when open; provides a means for positively introducing the closures into alinement with the inlet and outlet and also a means for moving the closures into seating positions by moving them in directions lying in axial alinement with the seating surfaces; provides means for positively holding the closures in relatively identical selective partially opened positions so that they may act as choke-valves; and, provides a wedging effect for positively seating the closures.

It is further pointed out that, when the valve assembly is in a closed position, any line pressure exerted upon the face of the closure 50 which is closing the inlet 2 tending to open the inlet, will also be exerted in a direction to hold the other closure 50 seated.

Obviously, the invention is susceptible of embodiment in forms other than that which is illustrated in the accompanying drawings and described herein, and applicable for uses and purposes other than as detailed, and I therefore consider as my own all such modifications and adaptations and other uses of the form of the device herein described as fairly fall within the scope of my invention.

Having thus described my invention, what is claimed and desired to be secured by Letters Patent, is:

1. In a valve, a housing, a flow-hole extending therethrough and comprised of an axially alined inlet and outlet, a valve chamber between the inner ends of the flow-hole and extending upwardly therefrom perpendicularly, a removable bonnet over the chamber, a shaft rotatably carried by the bonnet and held against longitudinal movement with relation thereto, said shaft having its lower end threaded, an internally threaded sleeve engaged by the threads of the shaft and having a square head on its lower end, a wedge positively engaged by the head and having oppositely disposed inwardly and downwardly beveled surfaces, a closure for the inner end of the inlet and another for the inner end of the outlet, each closure dove-tailed to one of the inclined faces of the wedging element, and means carried cooperatively by the housing, by the closures, and by the wedge for forcing the closures to remain adjacent each other while they are in the chamber above the flow-hole, for releasing them to movement away from each other by the wedge when they reach a position in the flow-hole in axial alinement therewith, and for preventing rotation of the wedge; said means including: an inverted substantially T-shaped groove carried by the housing walls at each side of the flow-hole, said grooves being alined with each other in similar positions with relation to the flow-hole; outstanding lugs carried by the wedge, slidably engaged in the grooves, and confined within the leg portions thereof; and, outstanding lugs carried by the closures and slidably engaged within the grooves, the last mentioned lugs adapted to slide upwardly and downwardly in the leg portions of the grooves as the wedge is moved vertically, and adapted to slide horizontally within the horizontal portions of the grooves after they reach the lowermost end of their throws if downward movement of the wedge is continued.

2. In a valve, a housing, a flow-hole extending therethrough and comprised of an axially alined inlet and outlet, a valve chamber between the inner ends of the flow-hole and extending upwardly therefrom perpendicularly, a removable bonnet over the chamber, a shaft rotatably carried by the bonnet and held against longitudinal movement with relation thereto, said shaft having its lower end threaded, a sleeve engaged by the threads of the shaft and having a square head on its lower end, a pair of complemental wedging elements positively engaged by the square head and having oppositely disposed inwardly and downwardly beveled surfaces, a closure for the inner end of the inlet and another for the inner end of the outlet, each closure dove-tailed to the inclined face of one of the wedging elements, and means for forcing the closures to remain adjacent each other while they are in the chamber above the flow-hole, and releasing them to movement away from each other by the wedge elements when they are positioned in the flow-hole in axial alinement therewith; said means including: an inverted substantially T-shaped groove carried by the housing walls at each side of the flow-hole, said grooves being alined with each other in similar positions with relation to the flow-hole; outstanding lugs carried by the wedge, slidably engaged in the grooves, and confined within the leg portions thereof; and, outstanding lugs carried by the closures and slidably engaged within the grooves, the last mentioned lugs adapted to slide upwardly and downwardly in the leg portions of the grooves as the wedge is moved vertically, and adapted to slide horizontally within the horizontal portions of the grooves after they reach the lowermost end of their throws if downward movement of the wedge is continued.

JOHN N. MOORE.